United States Patent [19]

Paik

[11] Patent Number: 4,752,048
[45] Date of Patent: Jun. 21, 1988

[54] FRONT-LOADING MECHANISM OF A VIDEOCASSETTE RECORDER UTILIZING A REEL MOTOR AS A POWER SOURCE

[75] Inventor: Myung C. Paik, Seoul, Rep. of Korea

[73] Assignee: Gold Start Co., Ltd., Seoul, Rep. of Korea

[21] Appl. No.: 883,782

[22] Filed: Jul. 9, 1986

[30] Foreign Application Priority Data

Jul. 10, 1985 [KR] Rep. of Korea ............... 8658/1985

[51] Int. Cl.⁴ .................... G11B 15/18; G11B 23/087
[52] U.S. Cl. .................... 242/199; 360/96.5
[58] Field of Search ................... 242/197–200; 360/96.5, 96.6, 96.1, 96.3, 96.4

[56] References Cited

U.S. PATENT DOCUMENTS

| | | | |
|---|---|---|---|
| 3,779,560 | 12/1973 | Yokata | 242/198 X |
| 4,308,562 | 12/1981 | Negishi | 360/96.5 X |
| 4,479,155 | 10/1984 | Takai et al. | 242/197 X |
| 4,532,563 | 7/1985 | Edakubo | 360/96.5 |
| 4,561,031 | 12/1985 | Tanabe | 360/96.5 |
| 4,583,138 | 4/1986 | Imazaike | 360/96.5 |
| 4,628,382 | 12/1986 | Okumura | 242/198 X |

Primary Examiner—John M. Jillions
Attorney, Agent, or Firm—Cushman, Darby & Cushman

[57] ABSTRACT

A front-loading mechanism of a videocassette recorder utilizing a reel motor as a power source is disclosed. A gear is formed integrally with a pinion of a reel motor. A lever is fixed on a base plate with a hinge so that a pulley and a gear are fixed integrally at one end portion and a sliding pin is fixed on the other end portion which is biased by a spring. Said sliding pin is slid along sliding surfaces provided on a function plate. And, a belt 23 is interconnected between said pulley and another pulley fixed on the rotating axis of a worm.

1 Claim, 3 Drawing Sheets

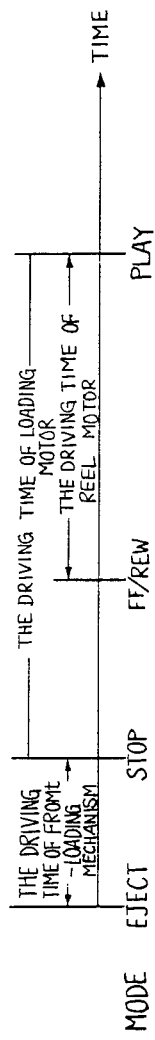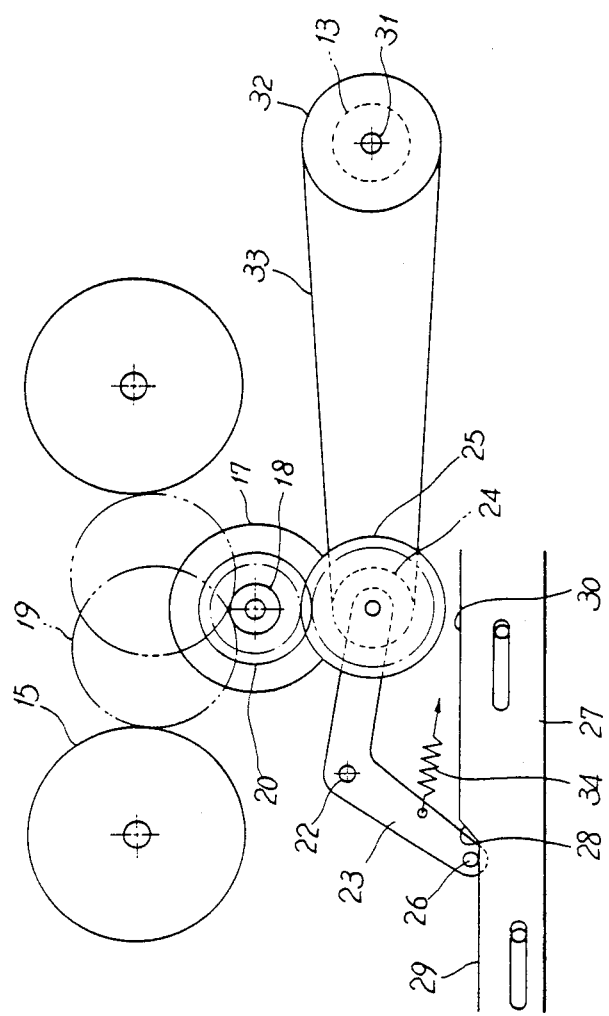

FRONT-LOADING MECHANISM OF A VIDEOCASSETTE RECORDER UTILIZING A REEL MOTOR AS A POWER SOURCE

BACKGROUND OF THE INVENTION

This invention relates generally to a front-loading mechanism of a videocassette recorder, and more particularly to an improved front-loading mechanism which may front-load a tape cassette by using the driving force of the existing reel motor.

The typical front-loading mechanism of a general VCR (Videocassette Recorder), which may load and unload a tape cassette from the front of the VCR, comprises a loading arm 7 having one end operatively connected to a loading motor 6 and the other end adapted to swing by a drive power of said motor 6 and provided with an end-opened slot 8, as shown in FIG. 2. The slot 8 receives one of guide pins 3 which protrude from respective side walls of a cassette holder 2 in which a tape cassette may be held. Each pin 3 also extends through a guide slot 5 formed at on each side wall 4 vertically mounted to a body of the VCR (not shown) and adapted to guide the cassette holder 2 between loading and unloading positions thereof as each pin 3 slides along the corresponding slot 5. By this arrangement, a counter-clockwise swing movement of the loading arm 7 effected by the drive power of the loading motor 6 causes the cassette holder 2 to be transferred from the unloading position indicated by a dotted line in FIG. 2 to a loading position indicated by a two dots-and-dashed line in FIG. 2, so that a tape cassette 1 is loaded on a reel table 9. When the tape cassette 1 has to be ejected from the cassette holder 2, the loading arm 7 swings in the reverse direction to that mentioned above by the drive power of the motor 6, so that the cassette holder 2 is transferred from the loading position to the unloading position, thereby enabling the tape cassette 1 to be ejected from the cassette holder 2.

However, such prior front-loading mechanism is costly to produce since it requires a separate motor for front-loading the cassette tape.

It is also known in this prior art to front-load the tape cassette by using the power from the tape loading motor which drives the tape loading mechanism to draw the tape from the cassette and load it on the running system. However, this prior art also has the problem of requiring a complicated mechanism using a solenoid and an epicyclic gear.

SUMMARY OF THE INVENTION

It is therefore an object of the present invention to provide a front-loading mechanism which may be driven, with simple construction, by the existing reel motor.

In view of the foregoing the present invention provides a front-loading mechanism of a videocassette recorder utilizing a reel motor as a power source. The mechanism has a loading arm having a geared end and another end which is swingable by the rotation of said geared end thereby moving a cassette holder between the unloading position and the loading position. In the loading position the cassette is loaded on a reel table which is driven by the reel motor by means of a pinion connected to the reel motor and an idler engaged with said pinion. The mechanism has a stepped sliding surface formed at one of the function plates of the recorder; and a lever hinged at the middle portion thereof to a base plate of a deck of the recorder by means of a hinge pin. The lever has at one end thereof a sliding pin continuously urged against the sliding surface of the function plate by a spring so as to swing the lever about said hinge pin as the stepped sliding surface slides. At the other end of the lever is a gear selectively engageable with a drive gear of the reel motor by the swing movement of said lever and a belt-pulley device including two pulleys and a belt connecting said pulleys. One pulley is fixedly mounted to a shaft of the gear supported to said lever and the other pulley is connected to the loading arm by means of a worm fixedly mounted to a shaft of the latter pulley and engaged with the geared end of the loading arm, so that a drive force of the reel motor can be selectively transmitted to the loading arm.

In accordance with the above-mentioned arrangement, it is possible to front-load the cassette tape by the driving force of the reel motor without using a separate loading motor.

BRIEF DESCRIPTION OF THE DRAWINGS

Other features and advantages of the invention will be apparent from the following description taken in connection with the accompanying drawings wherein:

FIG. 3 illustrates the driving times of the front-loading mechanism and loading motor;

FIG. 4 is a plan view showing the state of a cassette being loaded of the present front-loading mechanism;

DESCRIPTION OF THE PREFERRED EMBODIMENT

Referring first to FIG. 3, the present invention utilizes time differences that resides among the driving times of a front-loading mechanism, an existing tape loading motor, and the reel motor in the front-loading mode. The present invention comprises a mechanism wherein a front-loading mechanism is activated to load the cassette tape on a reel table, and then the existing tape loading motor is activated to effect various mode functions. At the time of cassette loading, the reel motor doesn't effect its essential function of driving the reel table, but remains stationary.

Accordingly, in the present invention the front-loading mechanism is driven by the reel motor. After the loading operation of the front-loading mechanism is completed, the transmission of the drive force of the reel motor to the front-loading mechanism is cut off by a simple construction of the present invention which can be activated by the drive force of the tape loading motor so that the function of the reel motor in every functioning mode can be perfectly effected.

Figure 1:
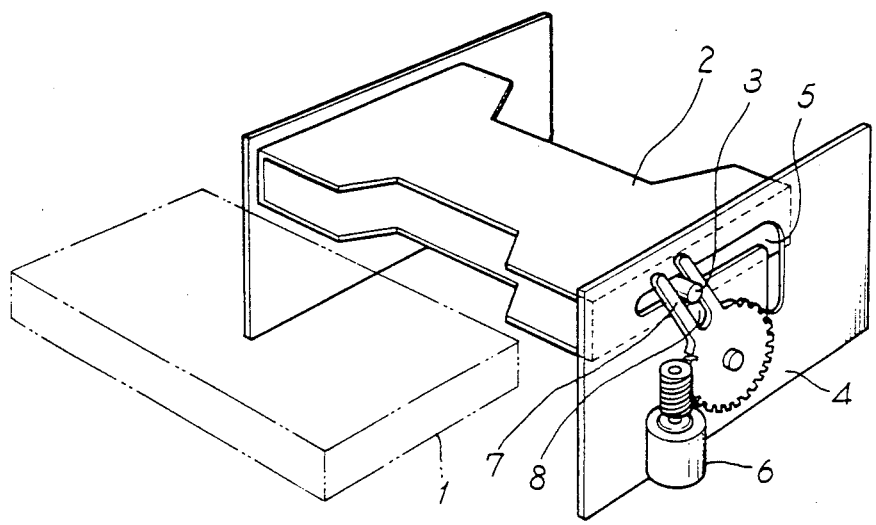
FIG. 1 is a perspective view of a prior art front-loading mechanism.
Figure 2:
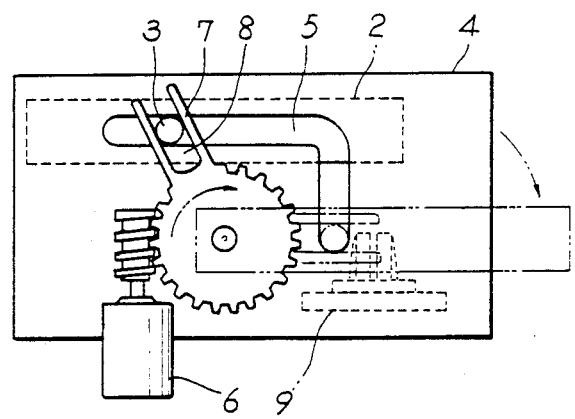
FIG. 2 is a side elevational view showing the prior art cassette loading and unloading states.
Figure 5:
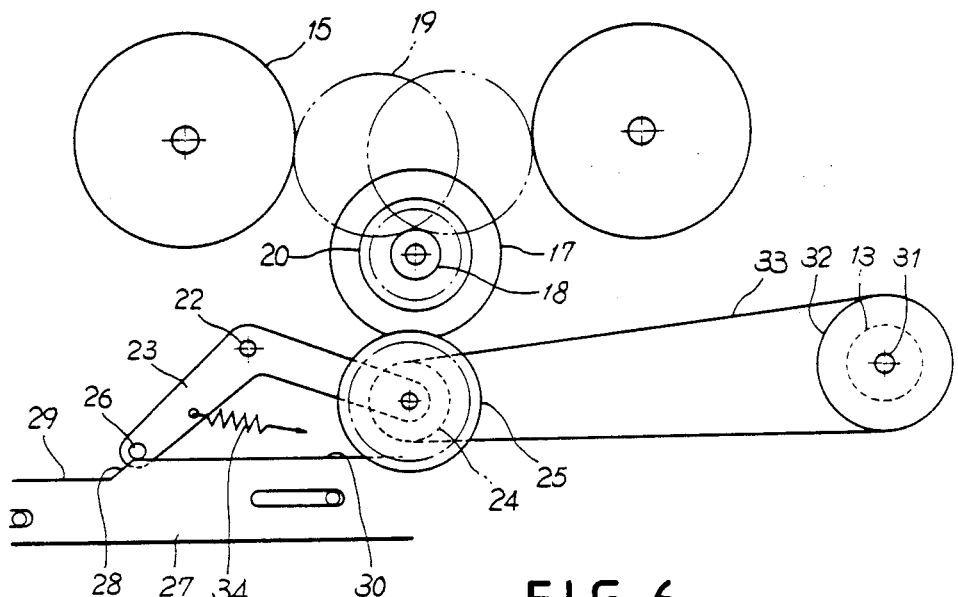
FIG. 5 is a plan view showing the state in which the cassette is perfectly loaded.
Figure 6:
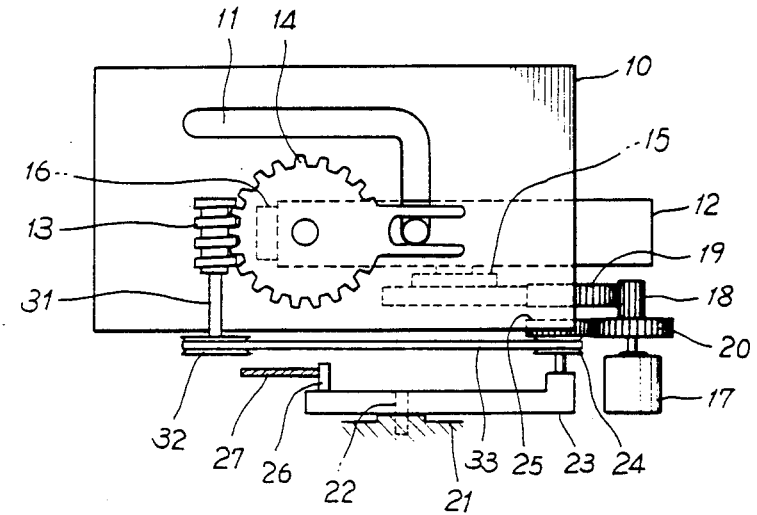
FIG. 6 is a side elevational view of the present front-loading mechanism.

Referring to the embodiment of the invention shown in FIGS. 4-6, the cassette holder 12, guided along guide slots 11 of side walls 10 is transferred by a loading arm 14 activated together with a worm 13 to load the cassette tape onto the reel table 15. The reel table 15 is driven by an idler 19 selectively engaged with a pinion 18 of a reel motor 17. A gear 20 is formed integrally with the pinion 18 of the reel motor 17. A lever 23 is pivotably fixed on the base plate 21 with a hinge 22 so that a gear 25 engaged with a pulley 24 and the gear 20 of the reel motor 17 are formed integrally therewith at its one end portion. And a sliding pin 26 is fixed at the other end portion which is biased with a spring 34. The sliding pin 26 is located on the function plate 27 driven by a tape loading motor (not shown) and is slid along the sliding surfaces 29 and 30 with a step or shoulder 28. A belt 33 is interconnected between the pulley 24 fixed on one end portion of the lever 23 and the pulley 32 fixed on the rotating axis 31 of the worm 13.

It will be appreciated that the function plate 27 is moved when the cassette is loaded or unloaded so that the sliding pin 26 of the lever 23 is located on the lower sliding surface 29. Accordingly, the gear 25 is engaged with the gear 20 of the reel motor 17 so that the pulley 24 and the pulley 32 of the worm 13 which are interconnected with a belt to each other may be rotated to drive the loading arm 14 interlocked with worm 13, whereby the cassette 16 will be loaded or unloaded.

Further, while the cassette remains loaded, the function plate 27 is moved so that the sliding pin 26 of the lever 23 is located on the upper sliding surface 30 and the gear 25 is separated from the gear 20 of the reel motor 17, thereby not transmitting the power to the loading arm 14.

As set forth hereinabove, the present invention provides a front-loading mechanism which may be driven only by adding simple power transmission means, not by applying a separate front loading motor. Further, it can remove the restriction on the design and reduced the cost of the front loading motor and the mechanical and electrical fittings thereof.

Although the invention hereof has been described by way of example of a preferred embodiment, it will be evident that other adaptations and modifications may be employed without departing from the spirit and scope thereof. For example, the capstan motor instead of the reel motor could be employed to drive the idler and reel table.

The terms and expressions employed herein have been used as terms of description and not of limitation; and thus, there is no intent of excluding equivalents, but on the contrary it is intended to cover any and all equivalents that may be employed without departing from the spirit and scope of the invention.

What is claimed is:

1. A front-loading mechanism for a video-cassette recorder, the video-cassette recorder having a base plate, a cassette holder to hold a videocassette and a reel table powered by a reel motor with gears comprising:

a loading arm having a geared end and a non geared end, the non geared end connected to the cassette holder so that the non geared end moves the cassette holder between a loading position with respect to the reel table and an unloading position with respect to the reel table, the non geared end moving in response to the rotation of the geared end;

a powered function plate having a stepped sliding surface, the function plate disposed to move between a loading and an unloading position;

a lever having a first end, a middle portion and a second end, the middle portion hinged to the base plate at a hinge point, the first end having a sliding pin thereon and the second end having a gear disposed to engage the gears of the reel motor; and a spring disposed to continuously urge the sliding pin against the sliding surface of the function plate so that the lever is swung about the hinge point as the stepped sliding surface slides and the gear on the second end of the lever are selectively engaged with the reel motor gears by the swinging movement of the lever;

and means responsive to engagement of the gear on the second end of the lever with the reel motor gears for driving the geared end of the loading arm whereby a drive force of the reel motor can be selectively transmitted to the loading arm.

* * * * *